June 18, 1968    D. H. REDMAN    3,389,312
PLURAL MOTOR, PLURAL PHOTOELECTRIC LINE FOLLOWER
OXYGEN JET CUTTING MACHINES
Filed Sept. 29, 1964    2 Sheets-Sheet 1
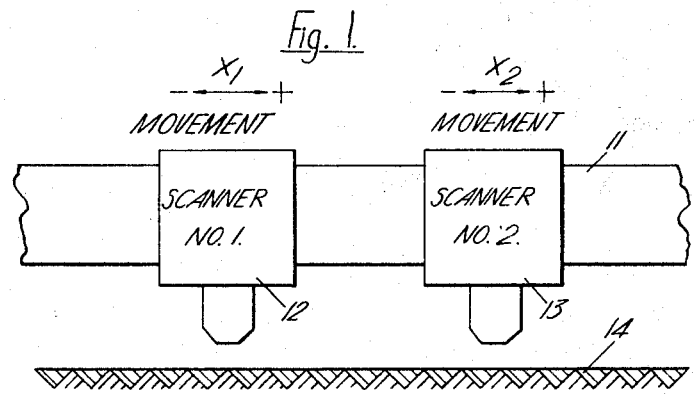
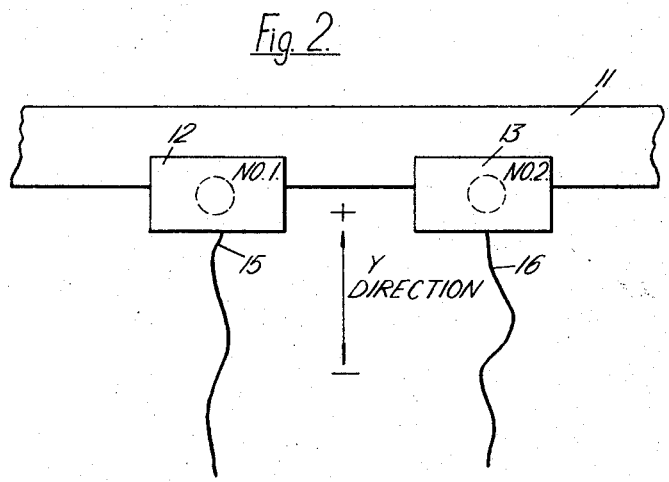
Inventor
DEREK H. REDMAN
By *Emisie & Smiley*
Attorneys Inventor
DEREK H. REDMAN 3,389,312
PLURAL MOTOR, PLURAL PHOTOELECTRIC LINE FOLLOWER OXYGEN JET CUTTING MACHINES
Derek Harry Redman, Croydon, Surrey, England, assignor to Hancock & Co. (Engineers) Limited, Croydon, England, a British company
Filed Sept. 29, 1964, Ser. No. 400,145
Claims priority, application Great Britain, July 20, 1964, 29,478/64
1 Claim. (Cl. 318—19)

ABSTRACT OF THE DISCLOSURE

A flame cutting machine for simultaneously making two cuts according to separate outlines carried on a substrate, in which a beam placed transversely of the machine and mounted for longitudinal movement along the machine carries two steerable photoelectric line follower heads independently movable along the beam for following the separate outlines, each follower head has a synchro resolver coupled for steering rotation with the follower head, the follower heads are moved along the beam according to transverse movement signals from the respective receivers, and the beam is driven longitudinally at constant speed.

---

This invention relates generally to oxygen jet cutting machines having photoelectric line followers, and more particularly to a control system by which two oxygen jet cutters may be used simultaneously to make cuts according to two dissimilar outlines.

The automatic cutting of shapes according to an outline in an oxygen jet cutting machine is a well known process and is normally carried out by causing a photoelectric scanner or follower to follow an outline on a substrate such as a sheet of paper, and causing an oxygen jet cutter to follow the same path over a workpiece, which is normally a sheet of steel. One kind of machine used for this purpose comprises a beam or table which is placed transverse to the longitudinal direction of the machine and is movable in the longitudinal direction. The beam carries an upper carriage which supports both a follower and the flame cutter which are movable along the beam or table. In an alternative type of installation the following device is arranged as a separate small tracing machine, the movements of the beam and cutter in the main machine being controlled by the movements of the follower over the outline in the tracing machine.

At times it may be necessary to cut workpieces which have opposite edges which are to have different shapes, andand in such cases it is convenient to be able to cut both edges at once.

It is already known to cut two dissimilar edges by the use of two separate followers and cutters which are independently traversed along the beam for transverse movement, the beam with both the cutters being moved in the longitudinal direction of the machine at a speed which is controlled by one of the followers.

In the following description the movements of the followers transverse to the length of the machine will be referred to as movements in the X direction and movements in the longitudinal direction of the machine will be referred to as movements in the Y direction.

The machines are arranged so that the movement of the follower and tool is substantially at constant speed, whatever its direction, so that the cutter is allowed sufficient time to do its work irrespective of its direction of travel.

The method, described earlier, of cutting two edges simultaneously has the disadvantage that if the follower which controls the movement of the beam in the Y direction happens to be following a portion of its outline which lies substantially in the Y direction the beam will be moving at maximum speed in the Y direction, but if the second follower at the same time reaches a portion of its outline which is steeply inclined to the Y direction it will have to make a very rapid movement in the X direction, and this may be too rapid for the cutter to be able to cut the workpiece. If, on the other hand, the movement in the Y direction is slowed down in order to allow for this condition, then if the reverse condition occurs, that is, the follower which is controlling the beam movement in the Y direction reaches a part of its outline which is steeply inclined to the Y direction, the movement of the other cutter in the X direction will be extremely slow. Accordingly the total time required for the operation may be unduly high.

The object of the invention is to provide an oxygen flame cutting machine having two follower heads for simultaneously following two outlines, two cutting heads for simultaneously cutting two shapes corresponding respectively to the two outlines, and means to drive the beam carrying the cutting heads at a constant speed in the Y direction by signals derived from means other than the follower heads.

The invention consists of an oxygen jet cutting machine comprising two follower heads mounted for simultaneous longitudinal movement and independent tranverse movement for following separate outlines, circuitry to cause each follower head to make independent transverse movements to follow one outline, and means to move the follower heads longitudinally at constant velocity.

One example of an arrangement according to the invention will now be described with reference to the accompanying drawings, in which—

FIGURE 1 shows diagrammatically two follower heads mounted on a cross beam which is adapted for movement in the longitudinal direction of the cutting machine;

FIGURE 2 is a diagrammatic plan view of the beam and follower heads;

Figure 3:
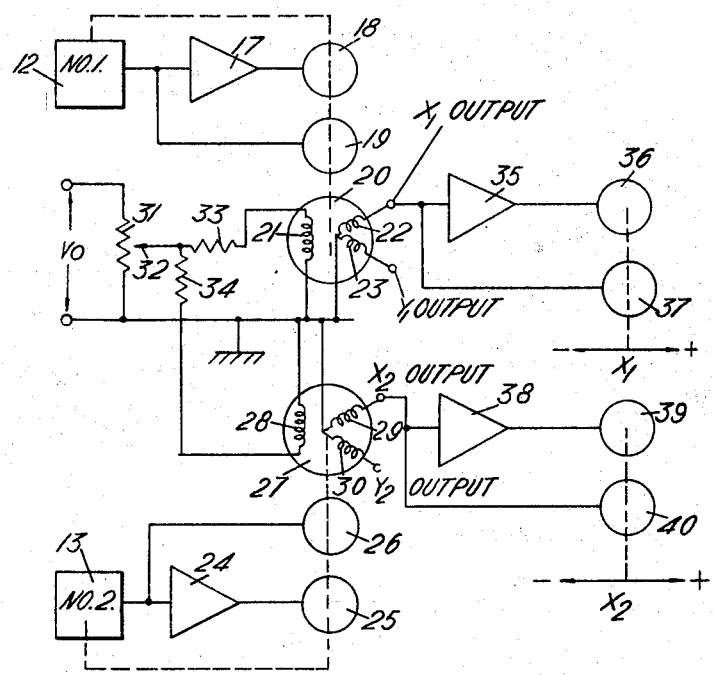
FIGURE 3 is a circuit diagram showing how the separate movements of the two follower heads in the X direction are obtained.

Referring to FIGURE 1, an oxygen jet cutting machine comprises a beam 11 carrying two follower heads, respectively 12 and 13, and respectively marked "Scanner No. 1" and "Scanner No. 2." The beam 11 is mounted on wheels and spans the width of the cutting machine, and the wheels are arranged to enable the beam to traverse the machine in the longitudinal direction of the machine, which is referred to as the Y direction. The follower 12 is movable along the beam 11 and its direction will be referred to as the $X_1$ movement while the follower 13 is similarly movable along the beam 11 and its direction will be referred to as the $X_2$ movement. This is merely to distinguish between the two followers which, in fact, move in precisely the same direction. The beam 11 is mounted above a surface 14 upon which a substrate containing an outline, such as a sheet of white paper having an outline drawn upon it, may be laid.

FIGURE 2 shows the beam 11 and the two followers 12 and 13 in plan view. It also shows two outlines, respectively 15 and 16, which are being followed respectively by the followers marked Scanner No. 1 and Scanner No. 2.

FIGURE 3 shows a preferred form of circuitry for securing the $X_1$ and $X_2$ movements of the respective followers. The follower 12 provides the usual steering signals which are fed to the input of an amplifier 17, the output of which is used to drive a motor 18. The motor 18 is coupled to the follower 12 and is able to rotate or steer it in either direction. The shaft of the motor 18 drives a tacho-generator 19, whose output is connected to the input of the amplifier 17 in opposition to the signals from the follower 12. The tacho-generator 19 provides a velocity damping signal to prevent "hunting" on the part of the motor, according to known principles.

The motor 18 also drives the rotor of a synchro or magslip resolver 20 which has a fixed winding 21 and a pair of windings 22 and 23 which are mutually at right angles. The operation of the synchro resolver is well known, the winding 21 setting up a field along a particular axis which crosses the rotational axis of the rotor and it induces voltages in the windings 22 and 23 whose magnitude is dependent upon the rotational position of the rotor. It will be understood that a sine/cosine potentiometer could be used in place of the resolver.

The follower 13 is connected to an amplifier 24, similar to the amplifier 17, and the amplifier 24 drives a motor 25 coupled to a tacho-generator 26 and also coupled to a resolver 27 having windings 28, 29 and 30, all precisely as described in connection with the scanner 12, and for the same purpose.

A potentiometer 31 is connected across an alternating current supply and by means of its slider 32 a desired voltage may be applied to the energizing windings 21 and 28 of the two resolvers. The winding 21 is fed through a resistor 33 and the winding 28 is fed through a resistor 34, the resistors 33 and 34 being of equal value. Consequently the excitation of the two resolvers is identical. The winding 22 of the first resolver marked "$X_1$ output" is applied to an amplifier 35 which drives a motor 36, and the motor 36 drives the follower 12 to and fro along the beam 11 to provide the $X_1$ movement. The motor 36 is also coupled to a tacho-generator 37, which provides a velocity damping signal which is fed to the input of the amplifier 35 in opposition to the $X_1$ output signal.

In a corresponding manner the $X_2$ output from the resolver 27 is fed to an amplifier 38 which feeds a motor 39 to traverse the follower 13 to and fro along the beam 11 to provide the $X_2$ movement, and the motor 39 also drives a tacho-generator 40 whose output is fed to the input of the amplifier 38 in opposition to the $X_2$ output.

Figure 4:
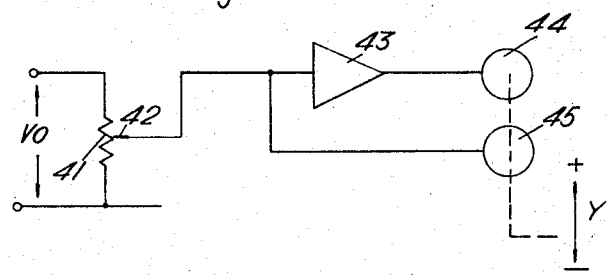
FIGURE 4 is a circuit diagram showing how the constant velocity movement of the beam carrying the follower heads is obtained.

It will be observed that the windings 23 and 30 marked "$Y_1$ output" and "$Y_2$ output" respectively are left unconnected. The beam 11 is traversed along the length of the cutting machine by means of the circuitry shown in FIGURE 4. A second potentiometer 41 is connected across the same voltage $V_o$ as the potentiometer 31 and its slider 42 is connected to the input of an amplifier 43. The output of the amplifier 43 feeds a motor 44 which traverses the beam 11 along the length of the cutting machine in the Y direction. The motor 44 also drives a tacho-generator 45 to provide a velocity damping signal which is fed to the input of the amplifier 43 in opposition to the signal from the potentiometer slider 42.

In operation, the followers 12 and 13 follow their respective outlines, but only the component of the outline in the $X_1$ and $X_2$ direction is caused to act upon the associated follower to traverse it along the beam 11. The movement in the Y direction, that is, longitudinally of the machine, is not under the control of either follower and is controlled entirely by the setting of the potentiometer 42. Accordingly, the beam 11 is traversed along the machine at a uniform speed, irrespective of the $X_1$ and $X_2$ movements of the followers 12 and 13 along the beam 11.

The particular advantage of the circuitry above described is that either Scanner No. 1 or Scanner No. 2 may be used on its own and the $Y_1$ output or $Y_2$ output, as the case may be, may be connected to the input of the amplifier 43, in which case the machine may be used as an ordinary oxygen jet cutting machine with a normal automatic follower, the unused follower head being moved to one end of the beam 11 and being inoperative.

I claim:

1. An oxygen jet cutting machine comprising two photoelectric line follower heads capable of producing steering signals, a beam placed transversely of the machine and mounted for movement longitudinally of the machine, the two follower heads being mounted on the beam for simultaneous longitudinal movement therewith and for independent transverse movement therealong for independently following separate outlines, a steering amplifier for each follower head fed with the steering signals therefrom, a steering motor for each follower head energized by the output of the respective steering amplifier, each steering motor being coupled to the respective follower head to steer it, a synchro resolver coupled to each follower head for steering rotation therewith, a transverse movement amplifier for each follower head fed with the transverse movement signal of the respective resolver, a transverse movement motor for each follower head energized by the output of the respective transverse movement amplifier, and another motor to move the beam longitudinally at a predetermined constant speed.

References Cited
UNITED STATES PATENTS

| | | |
|---|---|---|
| 2,631,028 | 3/1953 | Murr. |
| 2,887,639 | 5/1959 | Dutcher. |
| 3,004,166 | 10/1961 | Greene. |
| 3,017,552 | 1/1962 | Brouwer. |

ORIS L. RADER, *Primary Examiner.*

THOMAS E. LYNCH, *Examiner.*